United States Patent
Komatsubara et al.

(10) Patent No.: US 9,511,691 B2
(45) Date of Patent: Dec. 6, 2016

(54) SEAT FRAME FOR VEHICLE SEAT

(75) Inventors: Takao Komatsubara, Kurashiki (JP); Mitsuki Takata, Kurashiki (JP)

(73) Assignee: Namba Press Works Co., LTD, Kurashiki, Okayama (JP)

( * ) Notice: Subject to any disclaimer, the term of this patent is extended or adjusted under 35 U.S.C. 154(b) by 0 days.

(21) Appl. No.: 14/368,624

(22) PCT Filed: Apr. 11, 2012

(86) PCT No.: PCT/JP2012/059844
§ 371 (c)(1),
(2), (4) Date: Jun. 25, 2014

(87) PCT Pub. No.: WO2013/099307
PCT Pub. Date: Jul. 4, 2013

(65) Prior Publication Data
US 2015/0202998 A1     Jul. 23, 2015

(30) Foreign Application Priority Data
Dec. 26, 2011 (JP) .................... 2011-282638

(51) Int. Cl.
| | | |
|---|---|---|
| *B60N 2/68* | (2006.01) | |
| *B60N 2/42* | (2006.01) | |
| *B60N 2/07* | (2006.01) | |
| *B60N 2/22* | (2006.01) | |
| *B60N 2/427* | (2006.01) | |
| *B60N 2/06* | (2006.01) | |
| *B60N 2/28* | (2006.01) | |

(52) U.S. Cl.
CPC .............. *B60N 2/4228* (2013.01); *B60N 2/06* (2013.01); *B60N 2/07* (2013.01); *B60N 2/0705* (2013.01); *B60N 2/0732* (2013.01); *B60N 2/22* (2013.01); *B60N 2/42709* (2013.01); *B60N 2/42745* (2013.01); *B60N 2/68* (2013.01); *B60N 2/286* (2013.01); *B60N 2/682* (2013.01); *B60N 2/686* (2013.01)

(58) Field of Classification Search
CPC ........ B60N 2/68; B60N 2/286; B60N 2/682; B60N 2/686
USPC .............. 297/216.1, 452.18, 216.12–216.16, 297/452.19
See application file for complete search history.

(56) References Cited

U.S. PATENT DOCUMENTS

| | | | | |
|---|---|---|---|---|
| 3,501,200 A | * | 3/1970 | Ohta | B60N 2/4228 296/68.1 |
| 6,132,003 A | * | 10/2000 | Sakurai | B60N 2/68 297/361.1 |
| 6,709,053 B1 | * | 3/2004 | Humer | B60N 2/42709 297/216.1 |

(Continued)

FOREIGN PATENT DOCUMENTS

| | | |
|---|---|---|
| EP | 0 709 249 A2 | 5/1996 |
| JP | 7132767 A | 5/1995 |

(Continued)

OTHER PUBLICATIONS

European Search Report for International Appl. No. EP 12863896 dated Jun. 18, 2015, pp. 1-6.

*Primary Examiner* — Syed A Islam
(74) *Attorney, Agent, or Firm* — Renner, Kenner; Arthur M. Reginelli (57) ABSTRACT

A seat frame having an energy-absorbing portion capable of being deformed while absorbing rear-end collision energy by concentrating the energy on the energy-absorbing portion.

7 Claims, 11 Drawing Sheets

(56) References Cited

U.S. PATENT DOCUMENTS

| | | | |
|---|---|---|---|
| 7,066,552 B2 * | 6/2006 | Yoshida | B60N 2/64 297/452.18 |
| 7,537,283 B2 * | 5/2009 | Niitsuma | B60N 2/4214 297/216.1 |
| 8,132,862 B2 * | 3/2012 | Yamada | B60N 2/688 297/216.13 |
| 2009/0179477 A1 * | 7/2009 | Yamazaki | B60N 2/4228 297/452.18 |
| 2014/0103626 A1 * | 4/2014 | Seki | B60N 2/4228 280/730.2 |

FOREIGN PATENT DOCUMENTS

| | | | | |
|---|---|---|---|---|
| JP | 10-201561 | 8/1998 | | |
| JP | 2001-178584 | 7/2001 | | |
| JP | 2001-186957 | 7/2001 | | |
| JP | 2002-012072 A | 1/2002 | | |
| JP | 2003-335162 | 11/2003 | | |
| JP | 2003335162 A | * 11/2003 | | B60N 2/42 |
| JP | 2009-166658 | 7/2009 | | |
| WO | 2006/093644 A1 | 9/2006 | | |

* cited by examiner

SEAT FRAME FOR VEHICLE SEAT

This application is a national-stage application of International Application Serial No. PCT/JP2012/59844, FILED Apr. 11, 2012, which claims priority to Japanese Patent Application Serial No. 2011-282638, filed on Dec. 26, 2011, which are incorporated herein by reference.

TECHNICAL FIELD

The present invention relates to seat frame for a vehicle seat. More specifically, the present invention relates to a seat frame for improved safety in case of rear-end collision.

BACKGROUND ART

Figure 1:
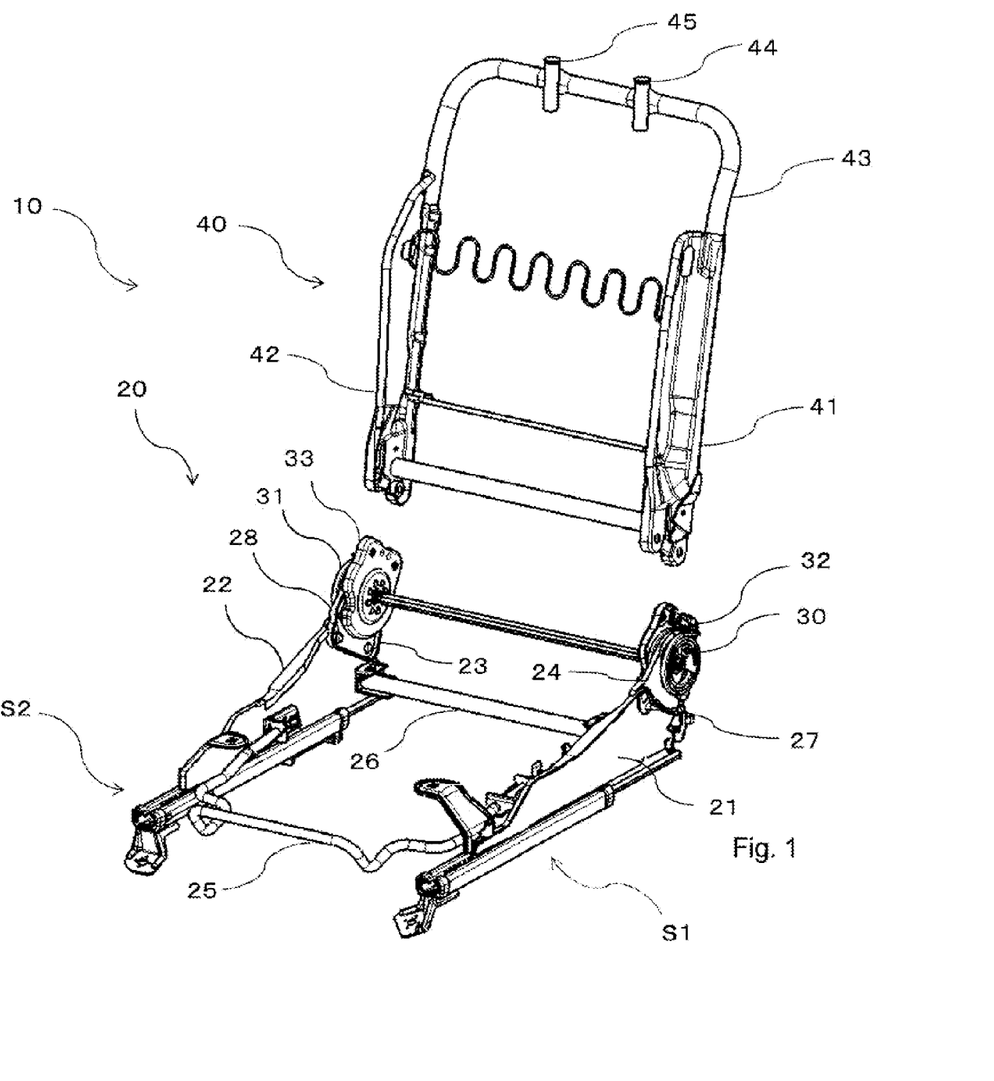
FIG. 1 is a perspective view of a conventional seat frame including a seat cushion frame and a seat back frame, shown in an exploded state.

FIG. 1 shows a conventional seat frame 10 included in a seat of a vehicle such as a car. As shown in FIG. 1, the seat frame 10 comprises a seat cushion frame 20 to be included in a seat cushion (not shown) and a seat back frame 40 to be included in a seat back (not shown).

Generally, the seat cushion frame 20 has side brackets 21 and 22, which are placed opposite each other with an interval in a lateral direction. The side brackets 21 and 22 are connected by such means as connecting members 25 and 26. The side brackets 21 and 22 are mounted to well-known slide mechanisms S1 and S2, respectively. The lower arms 23 and 24 are connected to rear portions of the side brackets 21 and 22 via connecting metal fittings 27 and 28, respectively. The upper arms 32 and 33 are pivotably connected to the lower arms 23 and 24 via well-known reclining mechanisms 30 and 31, respectively.

The seat back frame 40 has a pair of side plates 41, 42 and an inverted U-shaped seat back main frame 43. The pair of side plates 41 and 42 is to be mounted to the seat cushion frame 20 via upper arms 32 and 33, respectively. The inverted U-shaped seat back main frame 43 is connected to the side plates at their tops. The seat back main frame 43 has mounting parts 44 and 45 for inserting and mounting the headrest stays (not shown).

Figure 2:
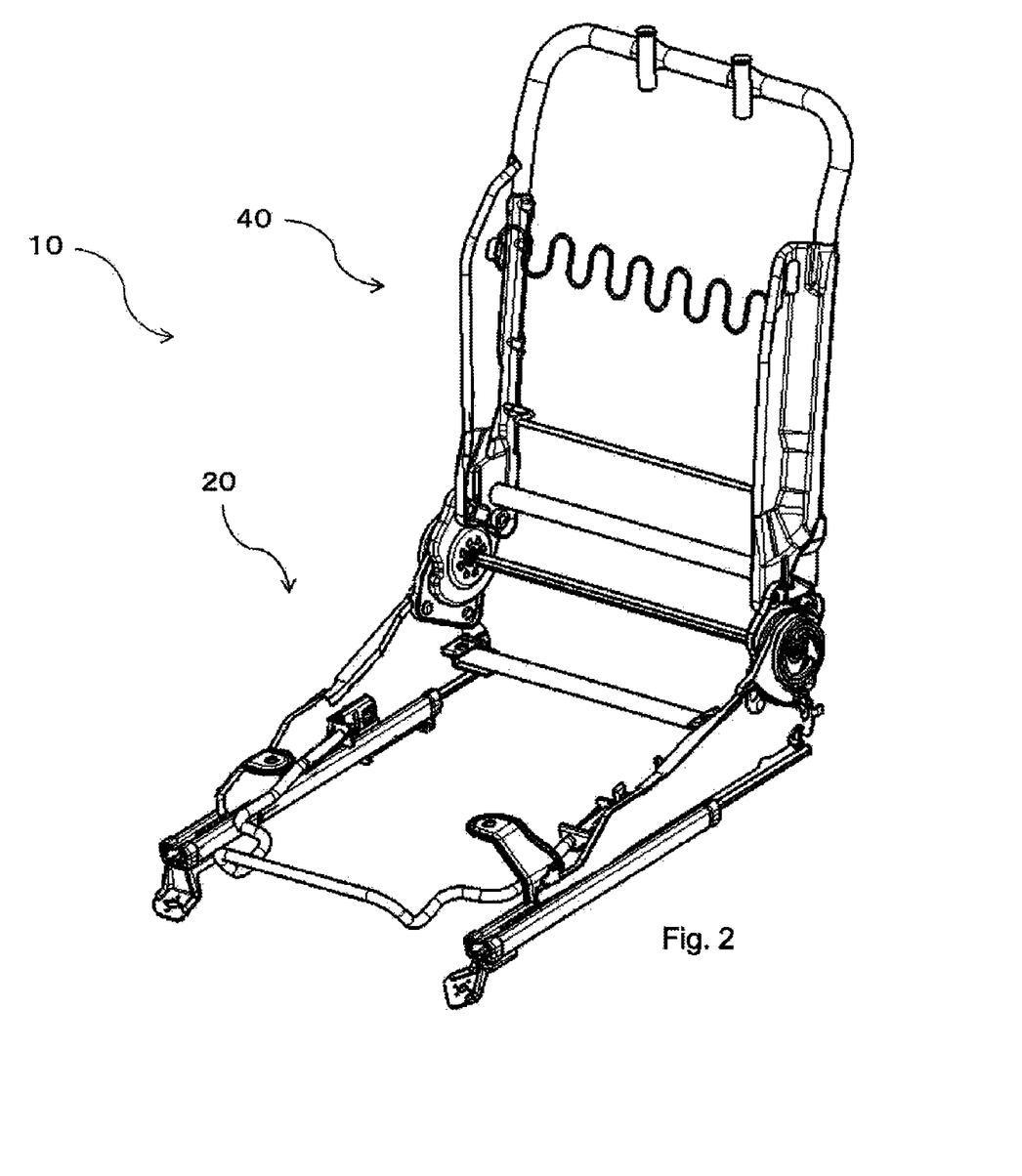
FIG. 2 is a perspective view of a conventional seat frame including the seat cushion frame and the seat back frame, shown in an assembled state.

FIG. 2 shows the conventional seat frame 10 having the seat cushion frame 20 and the seat back frame 40, shown in an assembled state.

Figure 3:
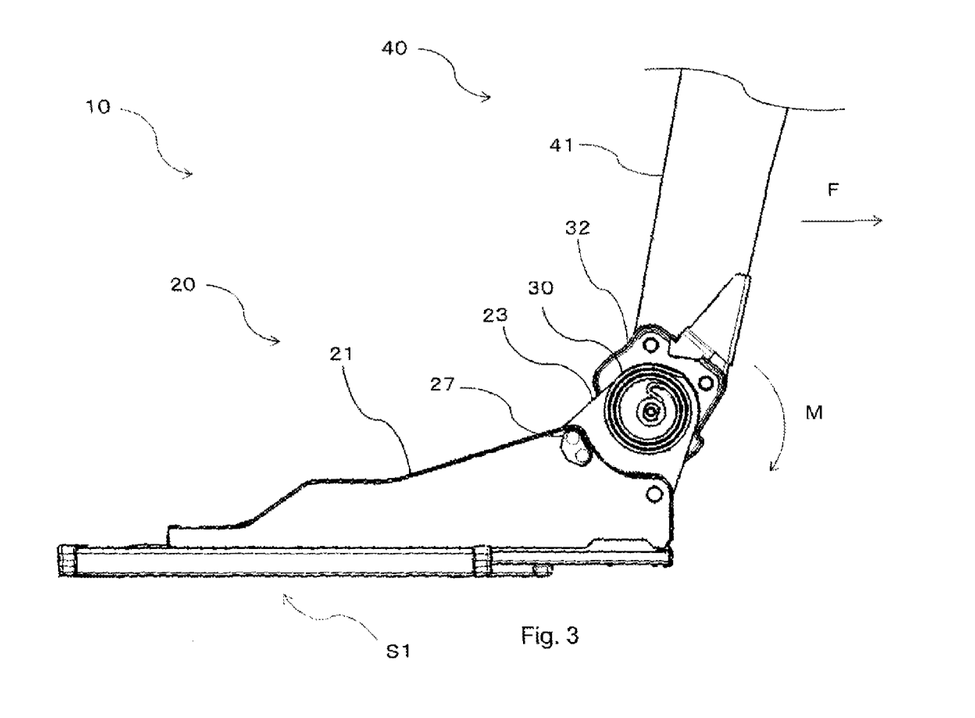
FIG. 3 is a side view of part of a conventional seat frame.

FIG. 3 shows a side view of part of the seat frame 10. When great impact force is applied from behind to a vehicle with seat frame 10 included in the seat, such as by being rear-ended by another vehicle (hereinafter referred to as a rear-end collision), backward force F is applied to the seat back frame 40, causing a bending moment M around the lower fixed end of the seat back frame 40, as shown. If the bending moment is large, the reclining mechanism 30, which connects the upper arm 32 and the lower arm 23, and/or the connecting metal fitting 27, such as caulking, which connects the lower arm 23 and the side bracket 21, could be damaged.

Recently, there is increased demand for eco-friendly vehicles, such as electric vehicles (EV) and plug-in hybrid vehicles (PHEV), and for greater fuel efficiency of conventional, gasoline-powered vehicles. Therefore, more lightweight vehicular components are required. Connecting members such as reclining mechanisms have been lightened and downsized. However, lightened or downsized connecting members such as reclining mechanisms could be damaged when subjected to a large bending moment at the time of a rear-end collision.

If the reclining mechanism 30 or the connecting metal fitting 27 is damaged or fractured, the seat back frame 40 could collapse backward. This could be prevented by enhancing the rigidity of the reclining mechanism 30 or the side bracket 21. However, enhancing rigidity may result in a failure to reduce weight. Therefore, a vehicular seat frame structure that is both reduced in weight and capable of improving safety is required.

For ensuring safety, a seat frame capable of absorbing collision energy has previously been proposed, as disclosed in Japanese Patent Application Laid-Open Publication No. 2009-154693 (Patent Document 1). The cushion frame for a vehicle seat disclosed in Patent Document 1 comprises a lower arm having a bead portion (a recess). A bend point in a dogleg shape when viewed from the side is formed on the rear side on the periphery of the lower arm. The bead portion is formed on the inside surface or outside surface of the lower arm and has an upper edge extending from the bend point. By the constitution described above, when a large backward force in applied to the seat back frame while a bending moment is applied to the reclining mechanism, the rear side of the lower arm forms a compressed shape in the vertical direction, thereby absorbing the collision energy.

CITATION LIST

Patent Literature

Patent Literature 1: Japanese Patent Application Laid-Open Publication No. 2009-154693

SUMMARY OF INVENTION

Problems to be Solved by the Invention

In the abovementioned lower arm disclosed in prior art, since the energy-absorbing part is configured so as to be recessed relative to the periphery of the lower arm, the lower arm main body can be deformed in a dogleg shape as seen from the rear, while the rear side of the lower arm forms a compressed shape in a vertical direction about the recessed bend point. That is, the energy caused by a rear-end collision is not necessarily concentrated on the energy-absorbing part but rather can be dispersed into parts of the lower arm other than the energy-absorbing part. Thus, the abovementioned lower arm disclosed in prior art cannot sufficiently concentrate the energy caused by a rear-end collision onto its energy-absorbing part and fails to appropriately absorb the energy.

In view of the abovementioned problems, it is the object of the present invention to provide a vehicular seat frame having an energy-absorbing portion capable of concentrating the collision energy onto it so as to absorb the energy, thereby ensuring safety even when the vehicle is rear-ended.

It is another object of the present invention to provide a vehicular seat frame with components reduced in weight while improving safety in case of a rear-end collision.

It is a further object of the present invention to provide a vehicular seat frame capable of securing the occupant in a seat including the seat frame even when the seat frame is deformed by a rear-end collision.

Solution to Problem

The present invention provides a seat frame for solving the above problems. The seat frame of the present invention comprises a seat cushion frame which is to be included in a seat cushion, and a seat back frame which is to be included in a seat back. The seat cushion frame comprises a pair of side frames which are placed opposite each other with an interval in a lateral direction, with each side frame being formed from a plate-like member. The seat back frame is connected to the pair of side frames at their respective rear portions. At least one of the pair of side frames has an energy-absorbing portion which extends forward from part of the rear periphery of one side frame. The energy-absorbing portion comprises a recess configured so that the plate-like member of one side frame is partly recessed toward the opposite side frame or toward the opposite side thereof. The peripheral edge of the recess is defined by the rear edge, the upper edge and the lower edge. The rear edge extends between the upper end and the lower end, each of which is located at the rear periphery of the side frame, with the lower end being located lower than the upper end. The upper edge extends between the upper end and the front end of the recess. The lower edge extends between the lower end and the front end.

As described above, the seat frame of the present invention has an energy-absorbing portion which comprises the recess being formed from the plate-like member so that a plate-like member portion extending forward from the rear periphery of the side frame is recessed toward the opposite side frame, or alternatively, toward the opposite side thereof. The recess has a peripheral edge defined by the rear, upper and lower edges, stopping the dispersion of rear-end collision energy at the front end of the energy-absorbing portion and concentrating the energy on the energy-absorbing portion.

One aspect of the seat frame of the present invention is that the longitudinal cross-section area of the recess of the energy-absorbing portion gradually increases from the front end to the rear periphery of the side frame (or to the rear edge of the energy-absorbing portion), thereby allowing the energy-absorbing portion to be smoothly deformed so as to efficiently absorb the concentrated energy of a rear-end collision.

A further aspect of the seat frame of the present invention is that the recess of the energy-absorbing portion has its ridge line extending from the front end to the rear end, which is located at the rear edge, allowing the energy-absorbing portion to be consistently deformed in vertical and horizontal directions while efficiently absorbing the energy of a rear-end collision.

Another aspect of the seat frame of the present invention is that each of the pair of side frames has an energy-absorbing portion, each of which comprises a recess. The recesses are formed from plate-like member portions constituting the side frames so that the plate-like member portions are recessed toward the opposite side frames, or alternatively, are recessed toward the opposite sides of the opposite side frames. As described above, both recesses of the energy-absorbing portions included in the left and right side frames are configured so that the plate-like member portions are recessed toward the opposite side frames or toward the opposite sides of the opposite side frames, allowing both side frames to be compressed and deformed in well-balanced vertical directions when the energy-absorbing portions of the left and right side frames are deformed, thereby preventing the side frame from moving in a lateral direction.

An additional aspect of the seat frame of the present invention is that the seat back frame includes a pair of side plates which are placed opposite to each other with an interval in a lateral direction. The pair of side plates is connected to the pair of side frames at the rear via reclining mechanisms. The energy-absorbing portions are located lower than the reclining mechanisms. Accordingly, a bending moment applied to the reclining mechanisms at the time of a rear-end collision can be effectively absorbed by the energy-absorbing portion. Also, since the seat frame deformation can occur at a lower point, the seat frame is capable of securely holding the occupant without imposing a burden on his/her waist.

Advantage of the Invention

As described above, in the seat frame of the present invention, when a large backward load is applied to the seat back such as at the time of a rear-end collision, and a large bending moment is applied to the connecting member which connects the seat back frame and the seat cushion frame, substantially only the energy-absorbing portion of the side frame included in the seat frame is deformed, so that the energy of the bending moment is effectively absorbed. The seat frame of the present invention can provide a vehicle seat with improved safety in that the connecting member is prevented from being damaged or fractured and the occupant is prevented from sliding upward because the side frame rear portion is capable of being compressively deformed in the vertical direction.

Furthermore, in the seat frame of the present invention, the rear-end collision energy applied to the connecting member between the seat back frame and the seat cushion frame can be concentrated so as to be effectively absorbed, thereby preventing even a lightweight connecting member from being damaged or fractured. The side frame of the present invention is capable of being connected to the seat back frame via the connecting member and is capable of being mounted to existing slide mechanisms and so on, so that the seat frame can be made of fewer components while still being given sufficient rigidity. Accordingly, the seat frame of the present invention can provide a lightweight vehicle seat with improved safety in case of a rear-end collision.

Furthermore, in the seat frame of the present invention, the left and right side frames have bilaterally symmetric energy-absorbing portions so that both side frames are capable of being compressed and deformed in vertical directions in a balanced manner, thereby preventing the seat frames from moving laterally. Accordingly, the occupant can be more securely supported, and therefore a vehicle seat with improved safety is provided.

BEST MODES FOR CARRYING OUT THE INVENTION

The following describes some features of the present invention with reference to preferred embodiments, which are not for the purpose of limiting the invention. The drawings may be simplified for the purpose of illustration, and the scale of the drawings may vary.

Figure 4:
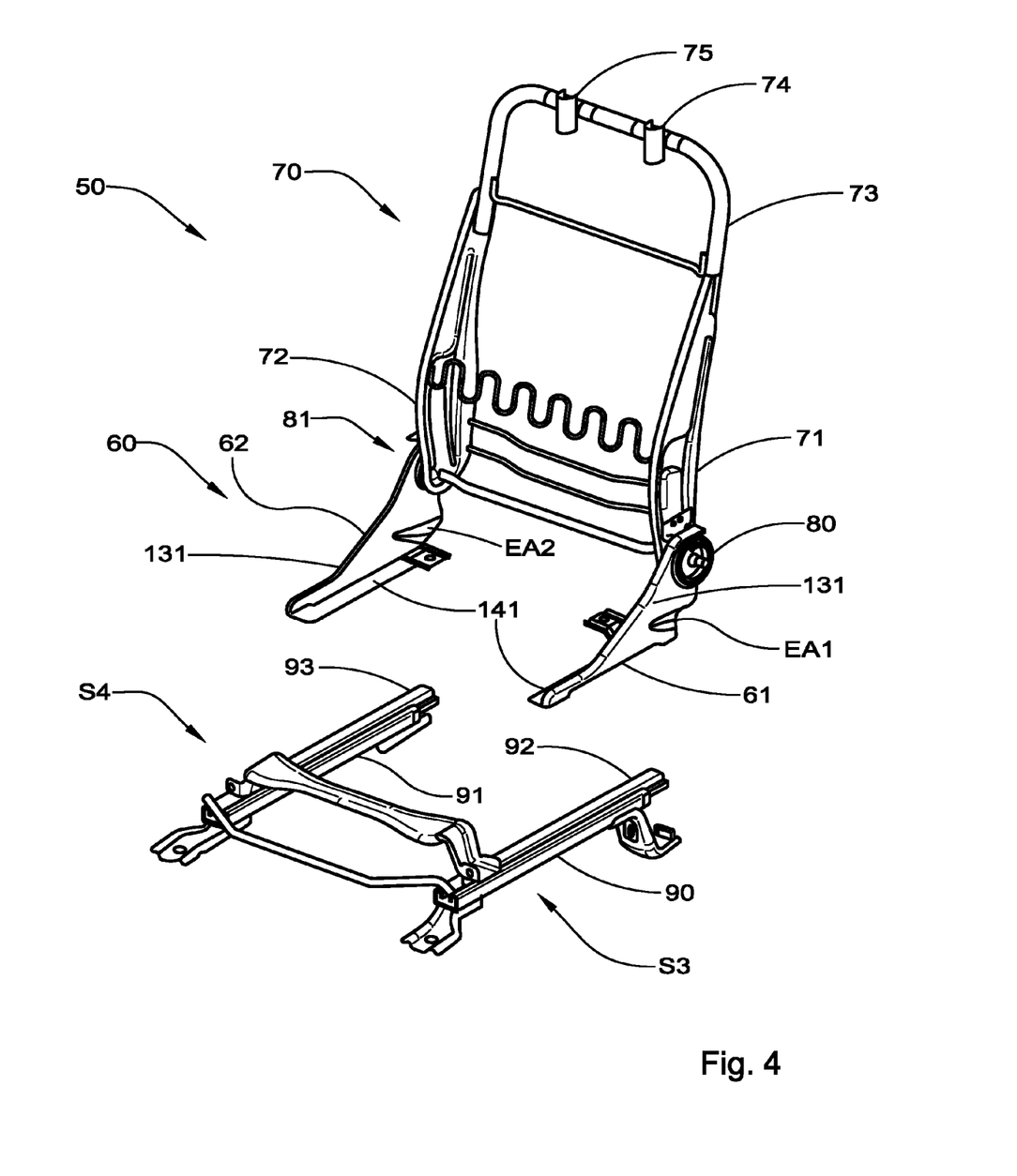
FIG. 4 is a perspective view of a seat frame and slide mechanisms as seen from the front, shown in an exploded state, in accordance with one embodiment of the present invention.

FIG. 4 shows a seat frame 50 in an exploded state, in accordance with one embodiment of the present invention. The seat frame 50 comprises a seat cushion frame 60, which includes a pair of left and right side frames 61 and 62, each formed from plate-like members, and a seat back frame 70. The side frames 61 and 62 have energy-absorbing portions EA1 and EA2, which extend forward from each of the rear peripheries of the side frames.

As described above, the side frames 61 and 62 are each formed from plate-like members. In accordance with one embodiment of the present invention, the energy-absorbing portions EA1 and EA2 comprise recesses configured so that each plate-like member is partly recessed toward the opposite side frame. In other words, the recesses are formed on surfaces other than the facing surfaces of the opposing side frames (i.e., are formed on the outside surfaces of the seat cushion frame). On the facing surfaces of the facing side frames 61 and 62 (i.e., on the inside surfaces of the seat cushion frame), protrusions are formed on the back sides of the corresponding recesses. In a preferred embodiment, such energy-absorbing portions EA1 and EA2 are integrally molded with the side frames 61 and 62, such as by press work.

To make the side frame lighter in weight, the side frames 61 and 62 may function as the lower arms or as the side brackets, both of which are included in the conventional seat frame (see FIG. 1). The seat back frame 70 may be connected to the side frames 61 and 62 at their rear portions. The side frames 61 and 62 may be mounted to upper members 92 and 93, which are moving parts of existing slide mechanisms S3 and S4 (e.g., seat adjusters), respectively.

By use of such side frames 61 and 62, a lightweight seat cushion frame 60 can be obtained.

Alternatively, the seat frame 60 may comprise the lower arms and the side brackets as in the conventional seat frame, with the side brackets having energy-absorbing portions.

The seat back frame 70 comprises a pair of left and right side plates 71 and 72. To make the seat back frame lighter in weight, the side plates 71 and 72 of the seat back frame 70 may function not only as the conventional side plates but also as the conventional upper arms (see FIG. 1). The seat back main frame 73 and headrest mounting members 74 and 75 are provided in the same manner as in the conventional seat back frame 10 (see FIG. 1).

The side plates 71, 72 and the side frames 61, 62 may be connected via existing reclining mechanisms 80, 81, respectively. The reclining mechanisms 80 and 81 allow the side plates 71 and 72 to incline relative to the side frames 61 and 62.

The side plates 71, 72 and the side frames 61, 62 may be connected via any connecting members or may be connected by welding without using the reclining mechanisms 80 and 81. The seat back frame 70 may comprise the conventional upper arms and the conventional side plates (see FIG. 1). Alternatively, the lower ends of the seat back main frame 73 may be connected to the side frames 61 and 62, respectively, without the upper arm or the side plate being included in the seat back frame 70.

Figure 5:
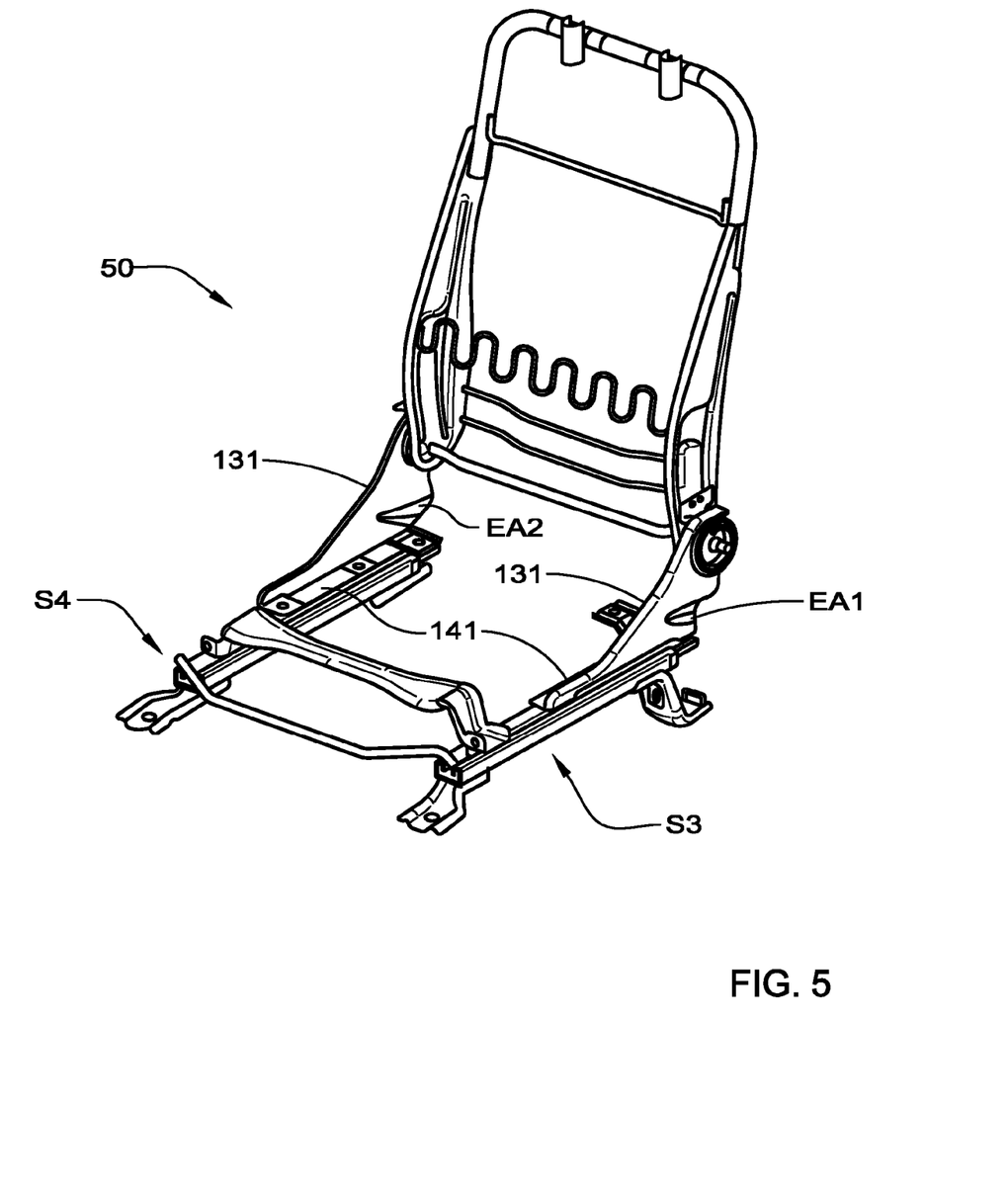
FIG. 5 is a perspective view of the seat frame mounted to the slide mechanisms as seen from the front, in accordance with one embodiment of the present invention.

FIG. 5 shows the seat frame 50 mounted to the slide mechanisms S3 and S4, in accordance with one embodiment of the present invention.

Figure 6:
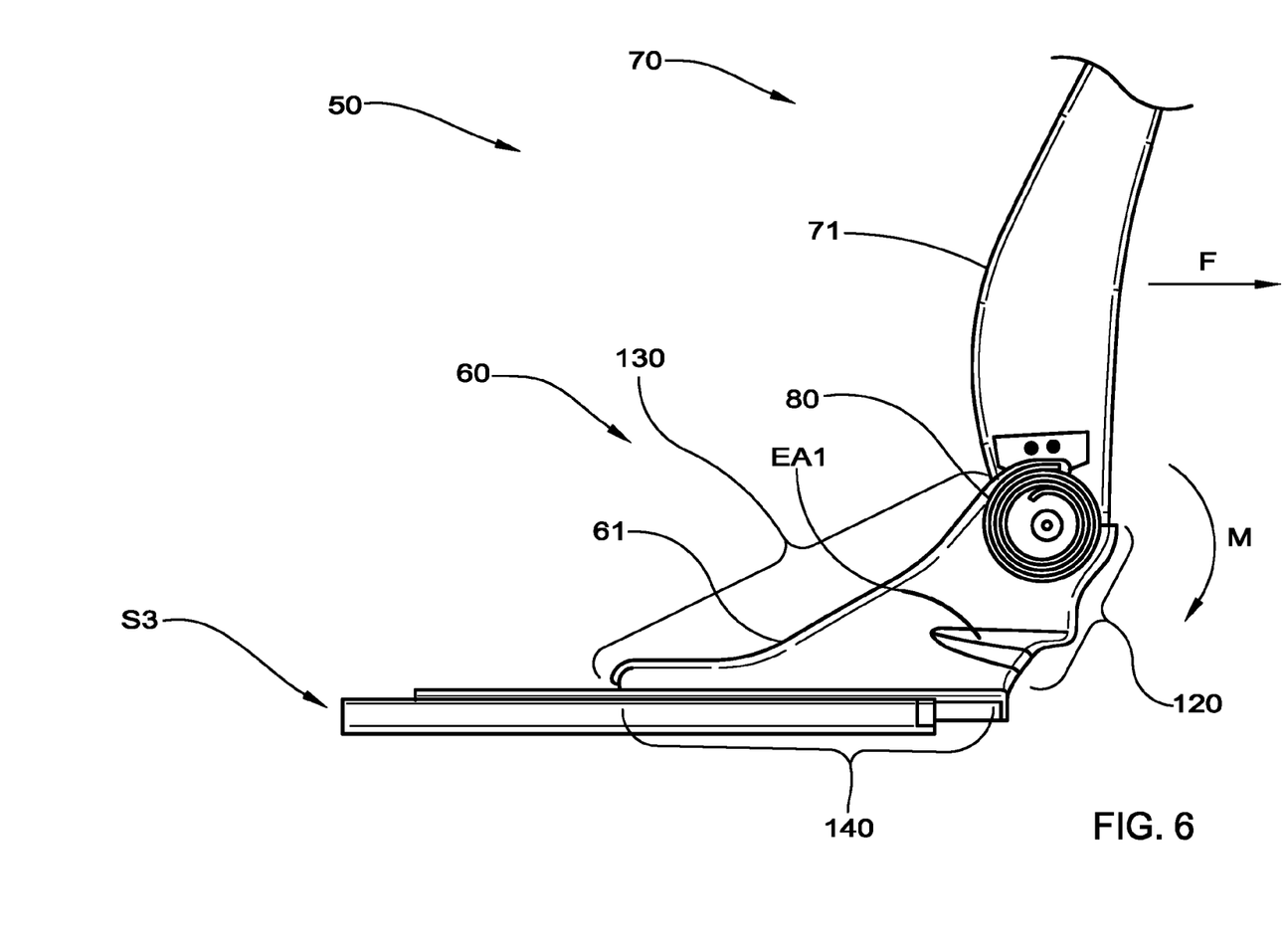
FIG. 6 is a side view of part of the seat frame, in accordance with one embodiment of the present invention.

FIG. 6 shows a partial side view of the seat frame 50. The energy-absorbing portion EA1 is located lower than the connecting member, such as the reclining mechanism 80, which connects the side frame 61 and the side plate 71, so that the energy-absorbing portion EA1 is deformed and efficiently absorbs the bending moment M.

Due to the shape of the energy-absorbing portion EA1, the deformation directions of the energy-absorbing portion EA1 can be made to be sufficiently consistent. For example, deformation in the vertical direction and deformation in the horizontal direction may be matched so that the energy-absorbing portion is folded in the vertical direction and is concurrently enlarged in the horizontal direction.

Figure 7A:
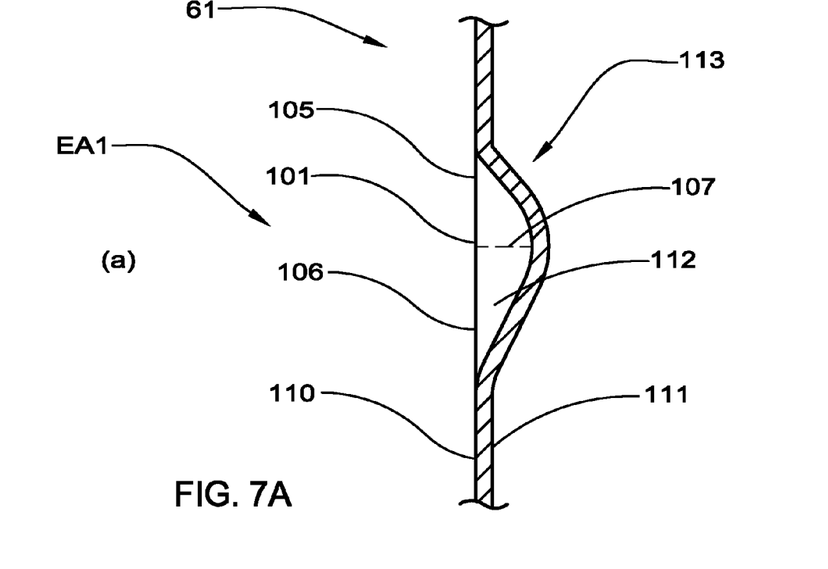
FIG. 7(a) is cross-section view and FIG. 7(b) is a side view, each of which schematically shows an energy-absorbing portion, in accordance with one embodiment of the present invention.
Figure 7B:
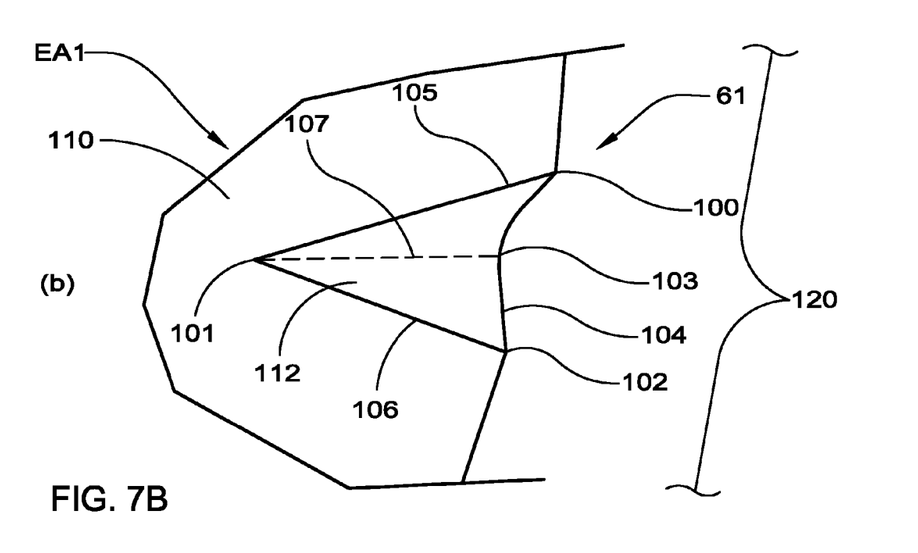

FIG. 7 shows a partial cross-section view and a partial side view of the side frame 61 having the energy-absorbing portion EA1.

As shown in FIG. 7(b), the recess of the energy-absorbing portion EA1 is formed on the (outside) surface 110 of the side frame 61, the surface 110 being other than the surface facing the opposite side frame 62 (see FIG. 4). The peripheral edge of the recess is defined by the rear edge 104, the upper edge 105 and the lower edge 106. The rear edge 104 extends between the upper end 100 and the lower end 102, which are located at the rear periphery 120, with the lower end 102 being located lower than the upper end 100. The upper edge 105 extends between the upper end 100 and the front end 101 of the recess. The lower edge 106 extends between the lower end 102 and the front end 101. The front end 101 is located on the outside surface of the side frame 61 (i.e., of the seat cushion frame 60). The energy-absorbing portion EA1 has the above-described peripheral edge so that, when being deformed and absorbing the rear-end collision energy, the deformation is limited to the front end 101, allowing the rear-end collision energy to be concentrated on the energy-absorbing portion EA1.

As shown, the recess of the energy-absorbing portion EA1 formed on the surface 110 has an almost triangular shape as seen from the side. Generally, a protrusion is formed on the surface 111, which is the back side of the surface 110, the protrusion having substantially the same shape as seen from the side as that of the recess.

FIG. 7(a) shows a longitudinal section view of the energy-absorbing portion EA1. The longitudinal section area of the recess of the energy-absorbing portion EA1 becomes larger toward the rear edge 104 from the front end 101 so that the energy-absorbing portion EA1 is deformed so as to be folded, thereby making the vertical deformation direction and horizontal deformation direction consistent.

In addition, the recess preferably has its ridge line 107 extending to rear end 103, which is located at the rear edge 104 from the front end 101. The ridge line 107 is a line consisting of a series of dots which are innermost in a series of longitudinal section areas of the recess of the energy-absorbing portion EA1, between the front end 101 and the rear edge 104, as the energy-absorbing portion EA1 is recessed toward the opposite side frame. Preferably, the recess ridge line 107 is a straight line.

The recess ridge line 107 may provide the energy-absorbing portion EA1 with a bend line suited to the deformation pattern of the energy-absorbing portion, allowing the energy-absorbing portion to absorb the energy more efficiently.

The shape of the recess may be defined by a recessed surface 112 and a plane in which the upper edge 105 and the lower edge 106 are included. The recess may be nearly in the shape of a triangular pyramid, having the front end 101 as the vertex, or, for example, may be in the shape of another polygonal pyramid or in a half-conical shape.

When the energy-absorbing portion EA1 is deformed so as to be folded, the upper edge 105 moves downward about the front end 101, while the recessed surface 112 is recessed more inward toward the opposite side frame. If the recessed surface 112 has a ridge line 107, the ridge line 107 will move inward about the front end 101. The energy-absorbing portion is configured so that movement of the upper edge 105 and the ridge line 107 are matched, thereby more efficiently being deformed and absorbing the energy. The front end 101 substantially does not move during deformation, so that the rear-end collision energy can be concentrated on the energy-absorbing portion EA1 and not be dispersed. Since the rear-end collision energy is not dispersed in a main body of the side frame 61, the side frame 61 may be deformed only in the vertical direction, without bending in the horizontal direction relative to the seat frame when the energy-absorbing portion EA1 is deformed.

Figure 8:
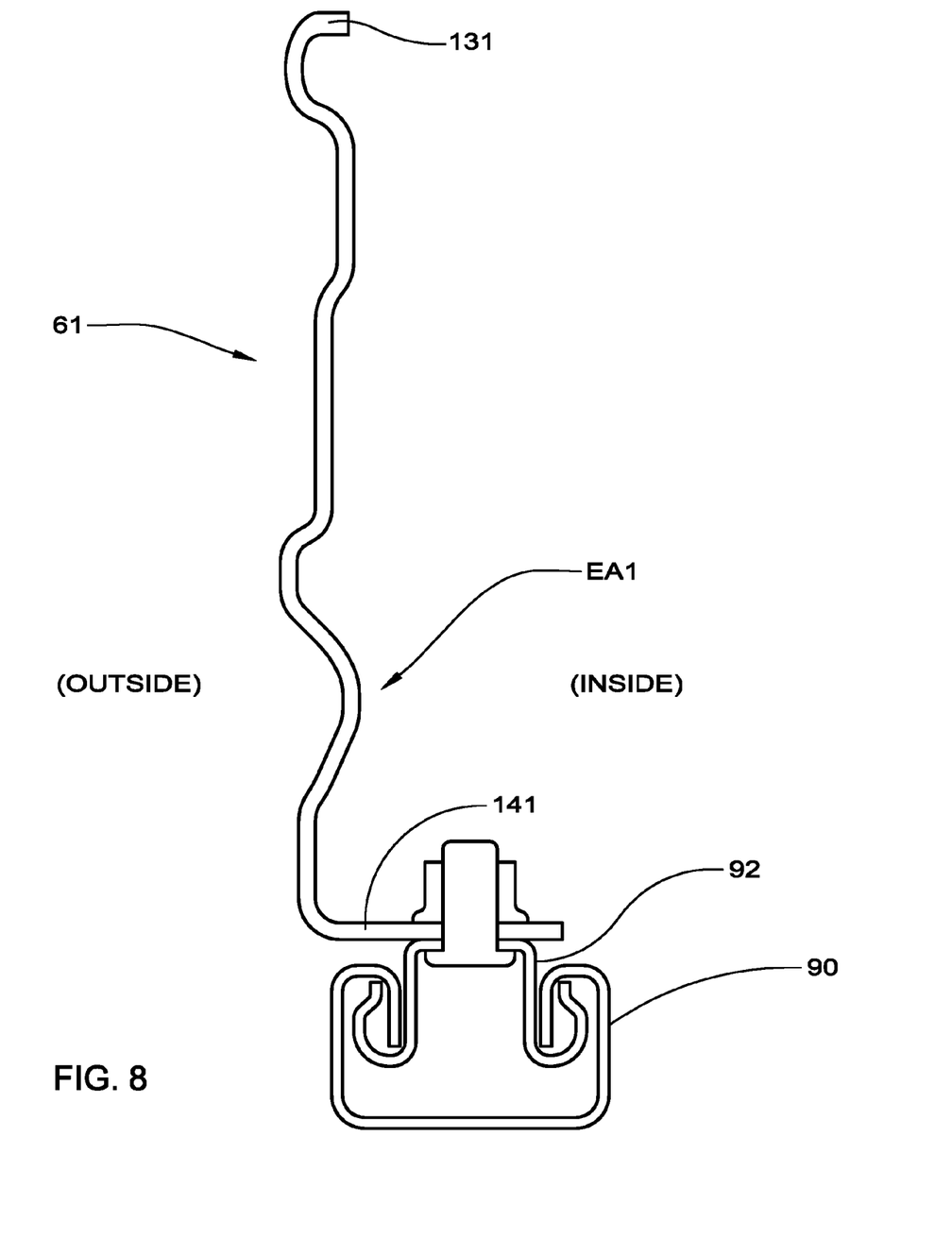
FIG. 8 is an enlarged end view of the side frame as seen from the rear, in accordance with one embodiment of the present invention.

FIG. 8 shows an enlarged end view of the side frame 61 as seen from the rear. The energy-absorbing portion EA1 is formed from part of the plate-like member of the side frame 61, with the plate-like member partly being recessed toward the opposite side frame. Since the opposite side frame 62 and the side frame 61 have bilateral symmetry, an enlarged end view of the side frame 62 is not shown.

The shape of the energy-absorbing portion EA1 and the location of the energy-absorbing portion EA1 between the upper side and lower side of the side frame 61 may be freely modified, and also the shape of the main body of the side frame 61 may be optionally modified. As shown, generally for the purpose of enhancing the strength of the side frame 61, the periphery of the side frame 61 preferably has flared parts (flanges 131 and 141) at the upper periphery 130 and lower periphery 140. Though the rear periphery 120 of the side frame 61 (see FIG. 7(b)) may also have a rear flange, at least the rear edge of the energy-absorbing portion does not have any flange. Alternatively, the rear edge may have a flange which is configured so as not to obstruct the deformation of the energy-absorbing portion.

Figure 9:
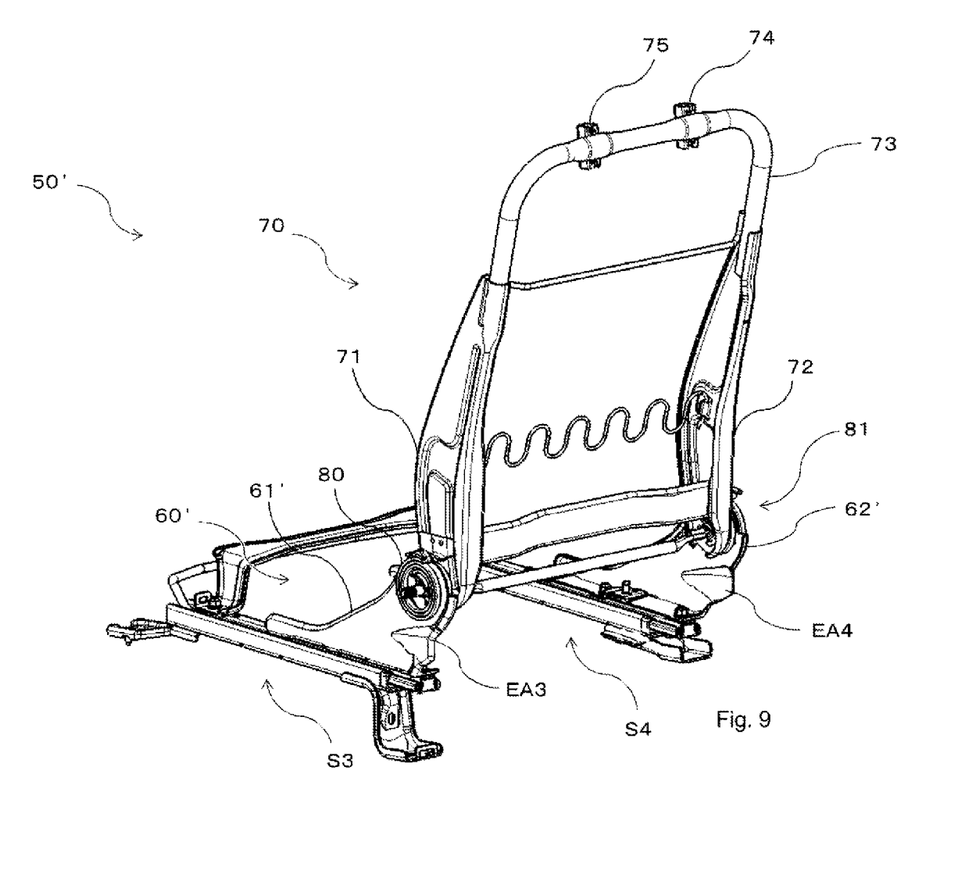
FIG. 9 is a perspective view of a seat frame mounted to slide mechanisms as seen from the rear, in accordance with another embodiment of the present invention.

FIG. 9 shows a seat frame 50' in accordance with another embodiment of the present invention. The seat frame 50' includes alternative energy-absorbing portions EA3 and EA4.

The energy-absorbing portions EA3 and EA4 are recesses which are formed from parts of plate-like members of side frames 61' and 62', respectively, so that the plate-like members are partly recessed toward opposite sides of the opposite side frames. In other words, the recesses are formed on the facing (inside) surfaces of the side frames 61' and 62'. Protrusions are formed on the back side surfaces of the facing surfaces, that is, on the outside surfaces.

Figure 10:
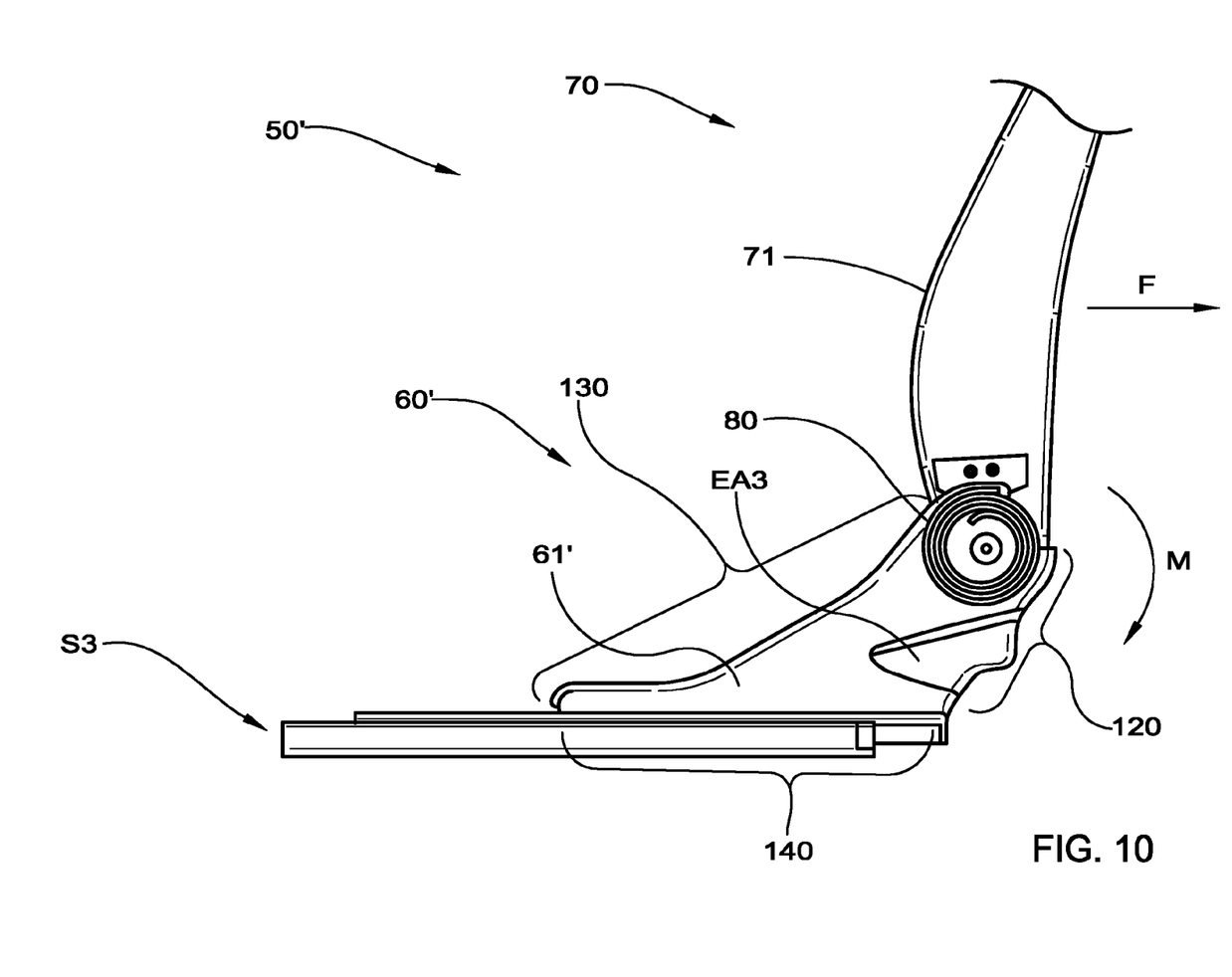
FIG. 10 is a side view of part of the seat frame, in accordance with another embodiment of the present invention.

FIG. 10 shows a partial side view of the seat frame 50'. When a large backward force F is applied at the time of rear-end collision, the energy-absorbing portion EA3 of the side frame 61' is deformed while absorbing the rear-end collision energy.

Figure 11:
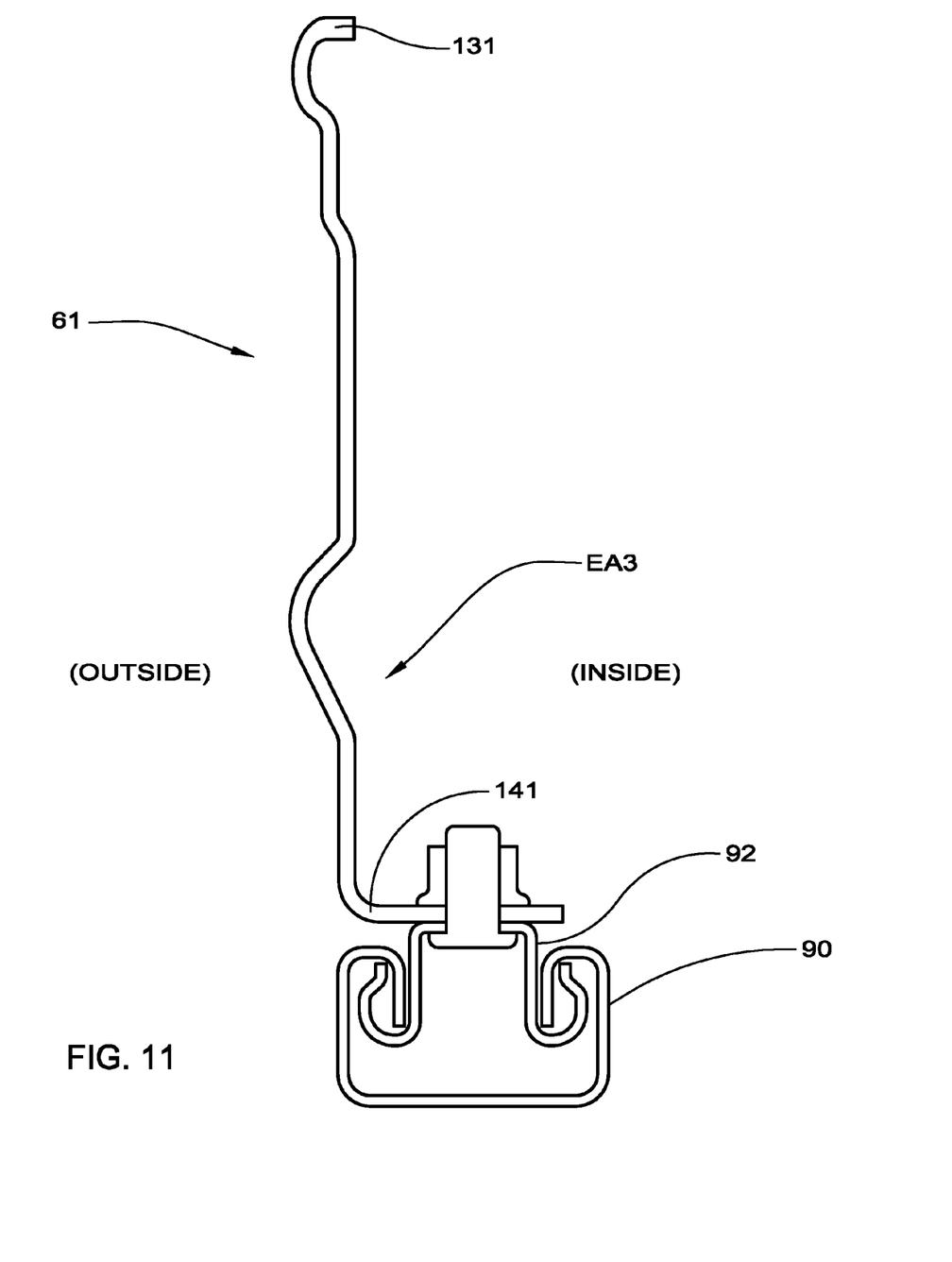
FIG. 11 is an enlarged end view of the side frame as seen from the rear, in accordance with another embodiment of the present invention.

FIG. 11 shows an enlarged end view of the side frame 61' as seen from the rear. The energy-absorbing portion EA3 is formed from a part of the plate-like member of the side frame 61', with the plate-like member being partly recessed toward the opposite side of the opposite side frame. Since the opposite side frame 62' and the side frame 61' have bilateral symmetry, an enlarged end view of the side frame 62' is not shown.

Within the scope of the above disclosure, the shapes and dimensions of the energy-absorbing portions of the present invention can be freely modified in accordance with, for example, the materials or the strengths of the plate-like members of the side frames, or the desired deformation patterns. The energy-absorbing portion may be configured to begin its folding deformation in response to the application of a predetermined amount of backward load. The energy-absorbing portion may also be configured to begin its deformation according to the strength of the connecting member, such as the reclining mechanism. That is, if a certain amount of energy causes the reclining mechanism to be damaged, the energy-absorbing portion may be configured to begin its deformation in response to half that amount of energy.

It will be understood by a person skilled in the art that a wide variety of modifications can be made without departing from the spirit and scope of the invention. The preferred embodiments of the present invention are intended only for the purpose of illustration, and are not intended to limit the scope of the invention.

REFERENCE NUMERALS 10 seat frame 1
20 seat cushion frame 1
21, 22 side bracket
23, 24 lower arm
25, 26 connecting member (reinforcer)
27, 28 connecting metal fitting
30, 31 reclining mechanism
32, 33 upper arm
40 seat back frame 1
41, 42 side plate 1
43 seat back main frame 1
44, 45 headrest mounting part 1
50, 50' seat frames 2, 3
60, 60' seat cushion frames 2, 3
61, 62 side frame 1
61', 62' side frame 2
70 seat back frame 2
71, 72 side plate 2
73 seat back main frame 2
74, 75 headrest mounting part 2
80, 81 reclining mechanism 2
90, 91 lower member
92, 93 upper member
100 upper end
101 front end
102 lower end
103 rear end 104 rear edge
105 upper edge
106 lower edge
107 recess ridge line
110 surface on side facing the opposite side frame side
111 surface on the opposite side frame side
120 rear periphery of the side frame

The invention claimed is:

1. A seat frame to be mounted to slide mechanisms, comprising:
   a seat cushion frame to be included in a seat cushion and an inverted U-shaped seat back frame to be included in a seatback;
   wherein the seat cushion frame comprises a pair of side frames formed from a pair of plate-shaped members, the side frames being connected to the lower portions of the seat back frame, respectively;
   wherein each periphery of the side frame comprises at its lower side a linear lower periphery and comprises a rear periphery extending upward from a rear end of the lower periphery and a upper periphery extending between a front end of the lower periphery and a upper end of the rear periphery;
   wherein side frames have energy-absorbing portions, respectively, energy-absorbing portion extending forward from part of the rear periphery, the energy-absorbing portions comprising bilaterally symmetric recesses, wherein the plate-shaped member of the side frames are partly recessed toward the opposite side frames, respectively, or toward the opposite sides of the opposite side frames, respectively;
   wherein each peripheral edge of the recess is defined by a rear edge, an upper edge and a lower edge, the rear edge extending between a upper end and a lower end of the recess, each of which is located at the rear periphery of the side frame, with the lower end being located lower than the upper end, the upper edge extending between the upper end and a front end of the recess, and the lower edge extending between the lower end and the front end of the recess; and
   wherein the side frames have at least at their lower and upper peripheries lower and upper flanges protruding toward opposite side frames, the lower flanges being flat and wider than the upper flanges so as to directly connect to the flat surfaces of upper members of the slide mechanisms, respectively.

2. The seat frame according to claim 1, wherein a longitudinal section area of each recess gradually increases toward the rear periphery from the front end.

3. The seat frame according to claim 1, wherein each recess has a ridge line extending between the front end and rear end which is located at the rear edge.

4. The seat frame according to claim 1, wherein the seat back frame comprises a pair of side plates placed opposite each other with an interval in a lateral direction, the seat back frame is connected to the pair of side frames at their rear portions by connecting the pair of side plates and the pair of side frames via reclining mechanisms, respectively, and
   wherein each energy-absorbing portion is located lower than the reclining mechanism.

5. The seat frame according to claim 2, wherein each recess has a ridge line extending between the front end and rear end which is located at the rear edge.

6. The seat frame according to claim 2, wherein the seat back frame comprises a pair of side plates placed opposite each other with an interval in a lateral direction, the seat back frame is connected to the pair of side frames at their rear portions by connecting the pair of side plates and the pair of side frames via reclining mechanisms, respectively, and
   wherein each energy-absorbing portion is located lower than the reclining mechanism.

7. The seat frame according to claim 3, wherein the seat back frame comprises a pair of side plates placed opposite each other with an interval in a lateral direction, the seat back frame is connected to the pair of side frames at their rear portions by connecting the pair of side plates and the pair of side frames via reclining mechanisms, respectively, and
   wherein each energy-absorbing portion is located lower than the reclining mechanism.

* * * * *